(12) United States Patent
Gagnon

(10) Patent No.: US 6,926,371 B1
(45) Date of Patent: Aug. 9, 2005

(54) DETACHABLE SPINDLE WITH SLEEVED CROSS CONNECTOR FOR TRAILER AXLES

(76) Inventor: Philippe R Gagnon, Treasure Cove 258, P.O. N-7110, Nassau (BS)

( * ) Notice: Subject to any disclaimer, the term of this patent is extended or adjusted under 35 U.S.C. 154(b) by 0 days.

(21) Appl. No.: 10/634,113

(22) Filed: Aug. 4, 2003

(51) Int. Cl.$^7$ ............................................. B60B 35/04
(52) U.S. Cl. ................... 301/132; 301/124.1
(58) Field of Search .................. 301/105.1, 124.1, 301/126, 131, 132

(56) References Cited

U.S. PATENT DOCUMENTS

| | | | |
|---|---|---|---|
| 894,131 A | * | 7/1908 | Frederick ..................... 301/132 |
| 977,985 A | * | 12/1910 | Vuncannon ................. 301/132 |
| 1,611,453 A | * | 12/1926 | Johnson ................. 280/93.512 |
| 1,762,407 A | * | 6/1930 | Mogford et al. ............ 228/135 |
| 2,634,169 A | * | 4/1953 | Martin ....................... 301/132 |
| 6,024,418 A | * | 2/2000 | Ebert .......................... 301/130 |
| 6,299,259 B1 | * | 10/2001 | MacKarvich ............... 301/127 |

* cited by examiner

Primary Examiner—Russell D. Stormer
(74) Attorney, Agent, or Firm—Michael I Kroll

(57) ABSTRACT

The present invention 10 discloses a tag axle commonly used in light, medium and heavy duty trailers 14 and is comprised of an axle beam 16 with a removable and replaceable spindle 24. The detachable spindle 24 has an extended back end 26 which is inserted in the axle beam 16 ends. The axle beam 16 ends are reinforced with a collar 18. The detachable spindle 24 and the axle beam 16 are locked together with a sleeved cross connector assembly 30, 32, 34, 36. The deformable sleeve 32 is fitted over the shaft of the cross connector 30 and the sleeved cross connector assembly is pressed into the cross-hole 20,28 which is drilled through the collar 18 and the back end 26 of the detachable spindle 24. The deformable sleeve 32 material is compressed into the cross-hole 20,28 to assure a tight fit and minimize any axial and radial movement between the spindle 24 and the axle beam 16. A wheel assembly 52 can then be attached to the spindles 24.

8 Claims, 12 Drawing Sheets

DETACHABLE SPINDLE WITH SLEEVED CROSS CONNECTOR FOR TRAILER AXLES

BACKGROUND OF THE INVENTION

1. Field of the Invention

The present invention relates generally to trailer axles and, more specifically, to a tag axle commonly used in light, medium and heavy duty trailers and is comprised of an axle beam with a removable and replaceable spindle. The detachable spindle has an extended back end which is inserted in the axle beam. The axle beam-ends are reinforced with a collar. The detachable spindle and the axle beam are locked together with a sleeved cross connector assembly. The deformable sleeve is fitted over the shaft of the cross connector and the sleeved cross connector assembly is pressed into the cross-hole which is drilled through the collar and the back end of the detachable spindle. The deformable material is compressed into the cross-hole to assure a tight fit and minimize any axial and radial movement between the spindle and the axle beam. The deformable sleeve is critical to the present invention because it allows the use of commercially available connectors and allows the cross-hole to be drilled using a standard drill and drill bit. The variation in the shaft diameter of commercial connectors such as bolts is quite large. The diameter of holes drilled with standard equipment and standard drill bits can also be quite large. Therefore, making the connection without the deformable sleeve would result in a sloppy fit with excessive axial and radial movement of the spindle. These types of movement are undesirable because they result in excessive tire wear, excessive localized stress that can initiate premature failure of the spindle and/or the collar or cross connector. Also the deformable sleeve greatly facilitates assembly because it does not require the cross-hole in the collar and the cross-hole in the spindle to be perfectly aligned for assembly. As long as the two holes are somewhat aligned, the sleeved cross connector will work its way into the opening and the collar and spindle will rotate to align themselves. Easy assembly is the key to successfully distributing the axle and keeping its cost low. Also, the deformable sleeve will increase the toughness of the cross connector. Toughness is the ability of a material to absorb the impact of high loads, which occur abruptly.

Replacing the deformable sleeve by a high precision drilling (reaming) and custom precision connectors would be impractical. First, the cost would be too high and secondly the cross-hole of the collar would need to be perfectly aligned with the cross-hole of the spindle to insert the very precise connector. Such precise alignment is extremely difficult and highly impractical for the intended manufacturing environment.

The cross connector assembly can be secured with a fastener on its other distal end. Transition washers are used on both sides of the bolt to assure that the head of the bolt and the fastener are against a flat surface but apply the clamping pressure against the circular collar.

Some spindles from current integrated hubs are bolted to the axle beam via an elaborate flange. The present invention does not use a flange connection. Flanges are too heavy and expensive and require too much time to assemble.

The spindle can be removed by removing the fastener and taping the connector out with a simple tool such as a hammer. Similarly, the spindle can be reattached by tapping the connector in and screwing on the nut. Currently, axle manufacturers have to be skilled welders; however, with the present invention axle manufacturers will only require basic assembly skills. Due to the differences in required skills by axle manufacturers, trailer manufacturers which currently purchase their axles from axle manufacturers could potentially assemble their own axle themselves and thus removing the traditional axle manufacturer from the supply chain. Such streamlining of the supply chain would make axles using the present invention, the lowest cost axles on the market.

In the use of the present invention, the spindle and wheel end components can be locked shut. When the product is determined to be unsafe for reuse, the product is further disabled by spot welding the wheel end fastener or crushing the spindle threads. The wheel end assembly can be installed and the axle will still be serviceable. If the wheel end is damaged then it can be removed by removing the sleeved cross connector assembly and a new wheel end assembly can be installed in the same axle beam. Repair can be made roadside in a timely and economical fashion. Axle recyclers will no longer be able to continue their traditional practice because they will not be able to open the wheel end to replace components. Recyclers will need a much larger percentage of new parts which will price them out of the market.

The present invention will be much easier to ship then the traditional axle, and axle beams can be shipped together stacked and the wheel ends assemblies can be shipped together.

Finally, axle distributors will be able to reduce their inventory greatly because the same wheel ends can be assembled on axle beams of different lengths. Since the length of the axle is determined at the time of purchase, distributors will be able to assemble the wheel end on the correct axle beam to meet the customer's specifications. Using the prior art, axle distributors must order the axles from axle manufacturers whose lead time can be several weeks. Using this invention, the distributor can assemble the required axle on the spot.

2. Description of the Prior Art

There are other axle devices designed for the purpose of the present invention. While these devices may be suitable for the purposes for which they where designed, they would not be as suitable for the purposes of the present invention as heretofore described. It is thus desirable to provide an axle that is non-recyclable, quickly serviceable and shipped efficiently comprising an axle beam with a removable and replaceable spindle having an extended back end which is inserted in the axle beam and axle beam ends are reinforced with a collar. The detachable spindle and axle beam are locked together with a sleeve cross connector assembly. A deformable material comprising a sleeve is fitted over the shaft of the cross connector and the sleeved cross connector assembly is pressed into the cross hole which is drilled through the collar and the back end of the detachable spindle. The deformable material is compressed into the cross-hole to assure a tight fit.

SUMMARY OF THE PRESENT INVENTION

The present invention discloses a tag axle commonly used in light, medium and heavy duty trailers and is comprised of an axle beam with a removable and replaceable spindle. The detachable spindle has an extended back end which is inserted in the axle beam ends. The axle beam ends are reinforced with a collar. The detachable spindle and the axle beam are locked together with a sleeved cross connector assembly. The deformable sleeve is fitted over the shaft of the cross connector and the sleeved cross connector assembly is pressed into the cross-hole which is drilled through the collar and the back end of the detachable spindle. The deformable sleeve material is compressed into the cross-hole to assure a tight fit and minimize any axial and radial movement between the spindle and the axle beam. A wheel assembly can then be attached to the spindles.

A primary object of the present invention is to provide a tag axle commonly used in light, medium and heavy duty trailers that is non-recyclable, quickly serviceable and can be shipped efficiently.

Another object of the present invention is to provide a tag axle commonly used in light, medium and heavy duty trailers and is comprised of an axle beam with a removable and replaceable spindle.

Yet another object of the present invention is to provide a detachable spindle having an extended end which is inserted in the axle beam.

Still yet another object of the present invention is to provide axle beam ends that are reinforced with a collar.

Another object of the present invention is to provide a detachable spindle and the axle beam that are locked together with a sleeved cross connector assembly.

Yet another object of the present invention is to provide a deformable sleeve that is fitted over the shaft of the cross connector and the sleeved cross connector assembly is pressed into the cross hole which is drilled through the collar and the back end of the detachable spindle. The deformable material is compressed into the cross-hole to assure a tight fit and minimize any axle and radial movement between the spindle and the axle beam.

Still yet another object of the present invention is to provide easy assembly, the key to successfully distributing the axle and keeping its cost low.

Another object of the present invention is to provide a cross connector assembly that is secured with a fastener on its one distal end. Transition washers are used on both sides of the connector to assure that the head of the connector and the fastener are against a flat surface but apply the clamping pressure against the circular collar.

Still yet another object of the present invention is to provide a spindle that can be removed by removing the fastener and taping the connector out with a simple tool such as a hammer. Similarly, the spindle can be reattached by tapping the connector in and screwing on the nut.

Yet another object of the present invention is to provide a spindle and wheel end components that can be locked shut. The locked wheel end assembly can be installed and the axle will still be serviceable. If the wheel end is damaged then it can be removed by removing the sleeved cross connector assembly and a new wheel end assembly can be installed in the same axle beam. Repair can be made roadside in a timely and economical fashion. Axle recyclers will no longer be able to continue their traditional practice because they will not be able to open the wheel end to replace components. Recyclers will need a much larger percentage of new parts which will price them out of the market.

Another object of the present invention is to protect the consumer against unsafe reuse of the product, by disabling the product by spot welding the wheel end fastener or crushing the spindle threads.

Additional objects of the present invention will appear as the description proceeds.

The present invention overcomes the shortcomings of the prior art by providing a tag axle commonly used in light, medium and heavy duty trailers and is comprised of an axle beam with a removable and replaceable spindle. The detachable spindle has an extended back end, which is inserted in the axle beam. The axle beam ends are reinforced with a collar. The detachable spindle and the axle beam are locked together with a sleeved cross connector assembly. The deformable sleeve is fitted over the shaft of the cross connector and the sleeved cross connector assembly is pressed into the cross-hole which is drilled through the collar and the back end of the detachable spindle. The deformable material is compressed into the cross-hole to assure a tight fit and minimize any axial and radial movement between the spindle and the axle beam.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
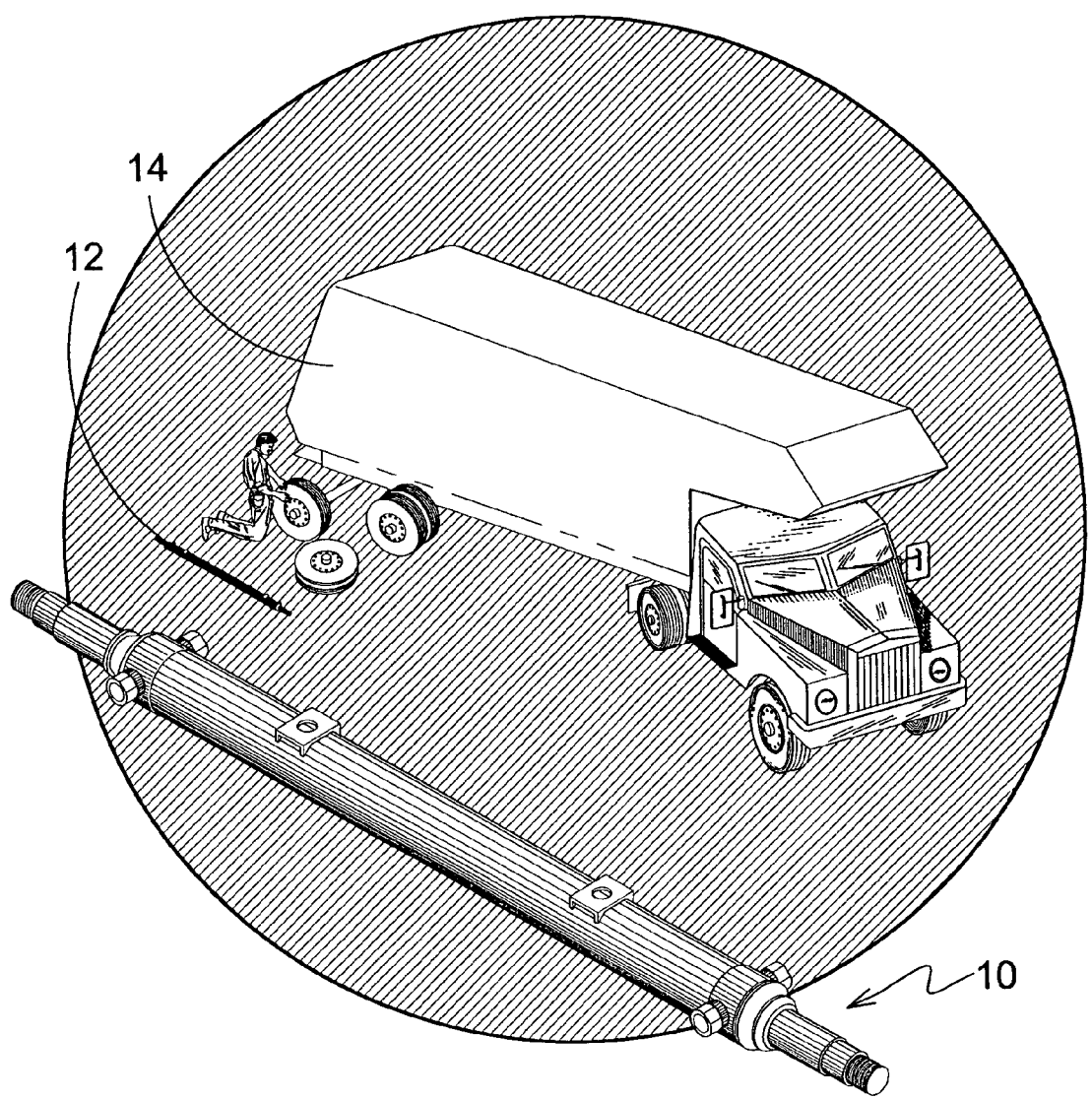
FIG. 1 is an illustrative view of the present invention in use.

With regard to reference numerals used, the following numbering is used throughout the drawings.

10 present invention
12 axles
14 vehicles
16 axle tube
18 collar
20 aperture
22 spring seat
24 spindle
26 spindle back end
28 spindle apertures
30 cross connector
32 deformable sleeve
34 washer
36 fastener
38 hub
40 grease seal
42 bearings 44 bearing cup
46 washer
48 fastener
50 dust cover
52 wheel assembly
54 threads

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments since practitioners skilled in the art will recognize numerous other embodiments as well. For a definition of the complete scope of the invention, the reader is directed to the appended claims.

Turning to FIG. 1, shown therein is an illustrative view of the present invention 10. The present invention 10 discloses a tag axle that is non-recyclable, quickly serviceable and shipped efficiently. Axles 12 are located underneath the chassis of vehicles 14 and are usually bolted to the suspension system which in turn is usually bolted to the chassis. A tag axle is an axle 12 which is non-steerable and non-tractable and is commonly used in light, medium and heavy duty trailers. Axles 12 consist of three main groups of components; the axle beam, the wheel end and suspension system. The problem with existing axles is if they become damaged they require removal. Removing the axle 12 is a time and money consuming task. Moreover, repair usually cannot be undertaken en route and the vehicle 14 must be carried to a repair facility. The object of the present invention 10 is to replace the existing axle 12 with a quickly serviceable, non-recyclable axle that can be utilized on the spot.

Figure 2:
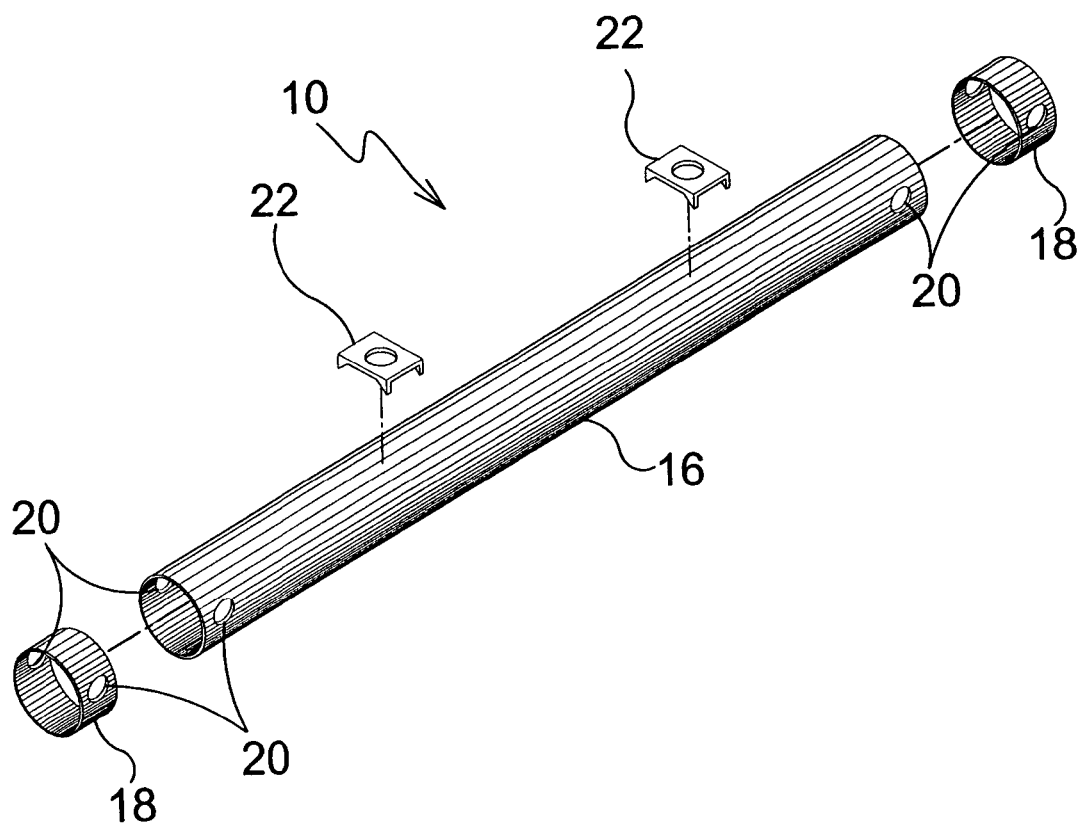
FIG. 2 is a perspective view of the present invention.

Turning to FIG. 2, shown therein is a perspective view of the present invention 10. Shown is a partial breakdown of components of the present invention 10 being a tag axle that is non-recyclable, quickly serviceable and shipped efficiently comprising an axle beam or tube 16 reinforced with a collar 18 that slips over the distal ends of the axle beam 16 having co-aligned cross apertures 20 therein which receive a cross connector assembly, not shown, and securing the spindle, not shown, within the axle beam. Also shown are spring seats 22.

Figure 3:
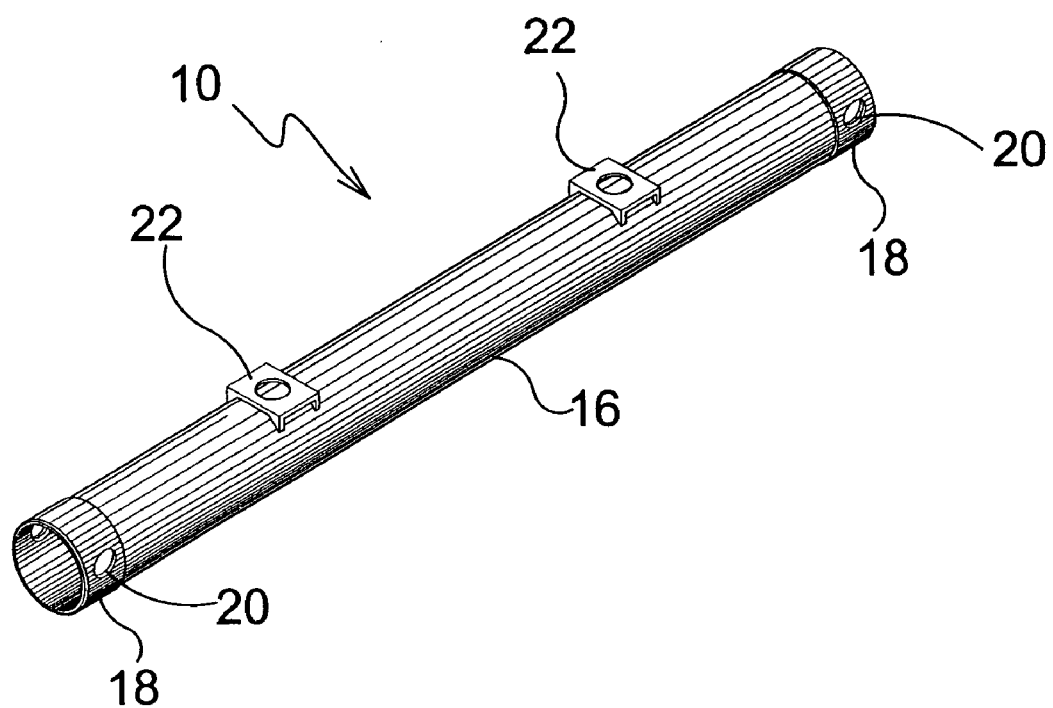
FIG. 3 is a perspective view of the present invention.

Turning to FIG. 3, shown therein is a perspective view of parts of the present invention 10. Shown is a partial assembly of components of the present invention 10 being a tag axle that is non-recyclable, quickly serviceable and shipped efficiently comprising an axle beam or tube 16 reinforced with a collar 18 that slips over the distal ends of the axle beam 16 having co-aligned cross apertures 20 therein which receive a cross connector assembly, not shown, and securing the spindle, not shown, within the axle beam. Also shown are spring seats 22.

Figure 4:
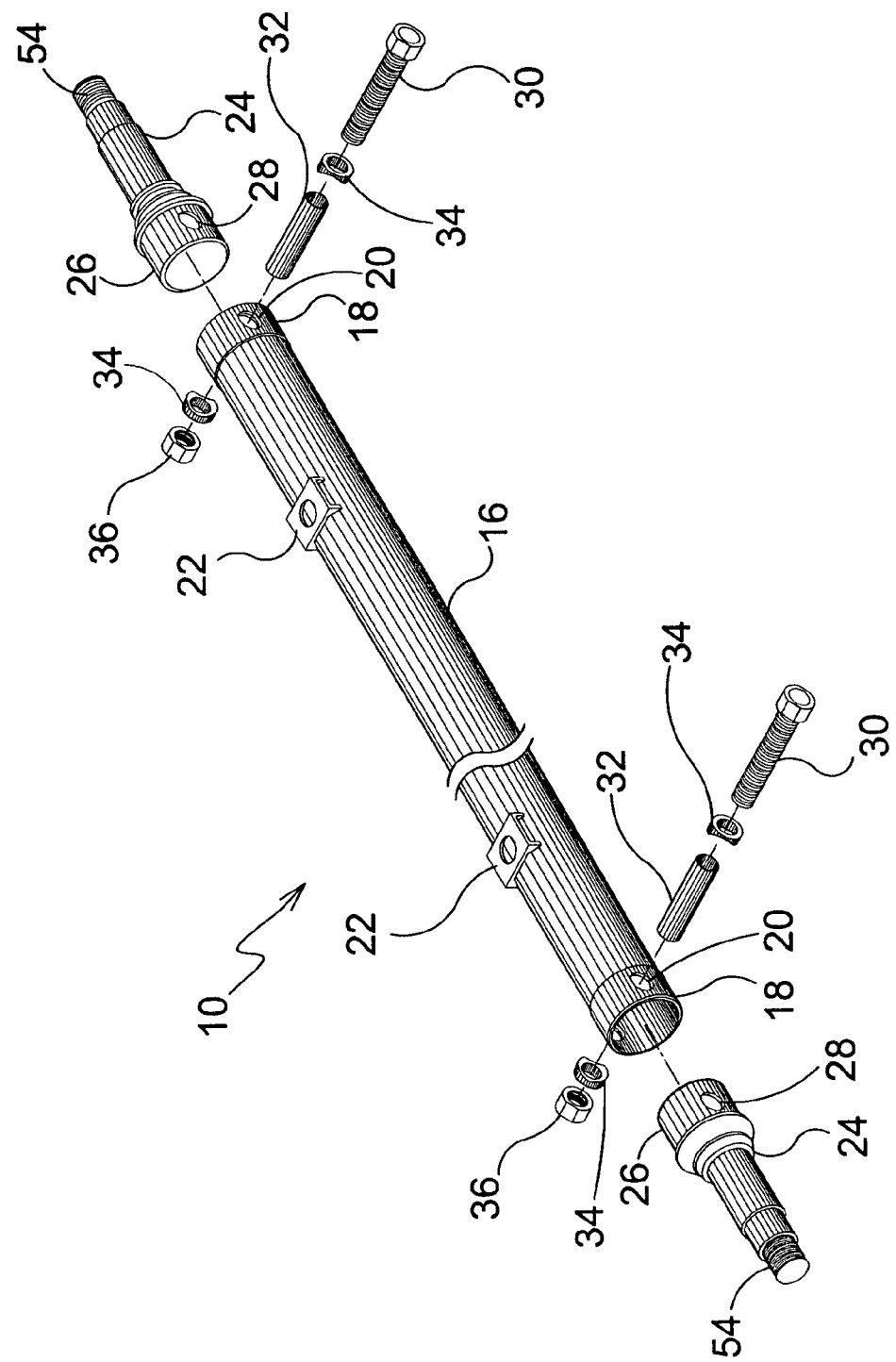
FIG. 4 is an exploded view of the present invention.

Turning to FIG. 4, shown therein is an exploded view of the present invention 10. The present invention 10 being an axle that is non-recyclable, quickly serviceable and shipped efficiently comprises an axle beam 16 with a removable and replaceable spindle 24 on each end. The detachable spindle 24 with cross apertures 28 has an extended back or rear end 26 which is inserted into each end of the axle beam 16 and a front end which is threaded at 54 for receiving a wheel assembly (not shown but see FIG. 11). The axle beam-ends are each reinforced with a collar 18. The detachable spindle 24 and the axle beam 16 are locked together with a sleeved cross connector assembly with cross connector 30, deformable sleeve 32, transition washers 34 and fastener 36. The deformable sleeve 32 is fitted over the shaft of the cross connector 30 and the sleeved cross connector assembly is pressed into the cross-hole 20 which is drilled through the collar 18 and the back end aperture 28 of the detachable spindle 24. The deformable sleeve 32 material is compressed into the cross-hole 20, 28 to assure a tight fit and minimize any axial and radial movement between the spindle 24 and the axle tube or beam 16. Also shown are spring seats 22.

Figure 5:
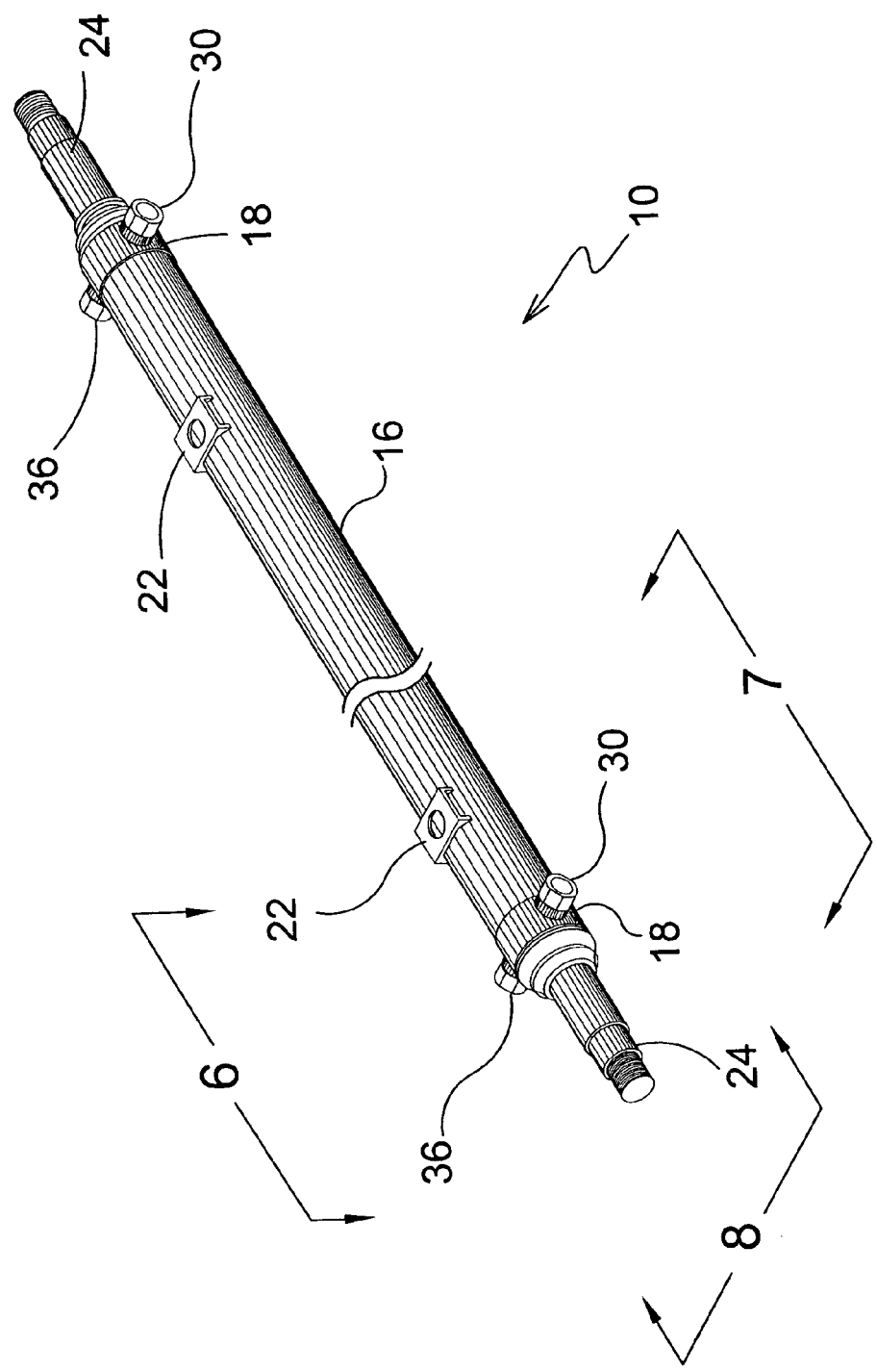
FIG. 5 is a perspective view of the present invention.

Turning to FIG. 5, shown therein is a perspective view of the present invention 10. Shown is an assembled view of the present invention 10 being an axle that is non-recyclable, quickly serviceable and shipped efficiently comprising an axle beam 16 with a removable and replaceable spindle 24. The detachable spindle 24 has an extended back end which is inserted in the axle beam 16. The axle beam ends are reinforced with a collar 18. The detachable spindle 24 and the axle beam 16 are locked together with a sleeved cross connector assembly at 30. The deformable sleeve is fitted over the shaft of the cross connector 36 and the sleeved cross connector assembly is pressed into the cross-hole which is drilled through the collar 18 and the back end of the detachable spindle 24. The deformable material is compressed into the cross-hole to assure a tight fit and minimize any axial and radial movement between the spindle and the axle beam. Also shown are fasteners 36 and spring seats 22.

Figure 6:
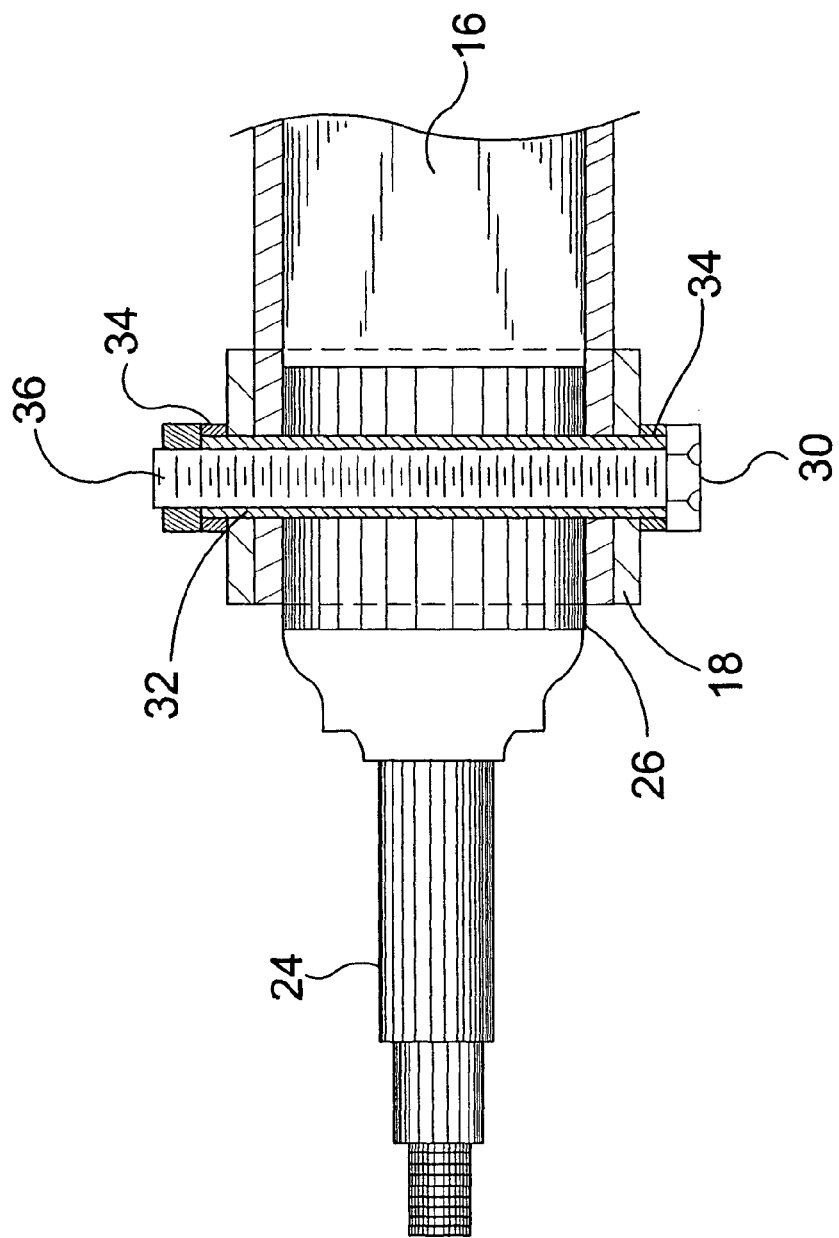
FIG. 6 is a sectional view of the present invention.

Turning to FIG. 6, shown therein is a sectional view of the present invention being an axle that is non-recyclable, quickly serviceable and shipped efficiently comprising an axle beam 16 with a removable and replaceable spindle 24. The detachable spindle 24 has an extended back end 26 which is inserted in the axle beam 16. The axle beam 16 ends are reinforced with a collar 18. The detachable spindle 24 and the axle beam 16 are locked together with a sleeved cross connector assembly 30, 32, 34, 36. The deformable sleeve 32 is fitted over the shaft of the cross connector 30 and the sleeved cross connector assembly is pressed into the cross-hole which is drilled through the collar 18 and the back end of the detachable spindle 24. The deformable material is compressed into the cross-hole to assure a tight fit and minimize any axial and radial movement between the spindle 24 and the axle beam 16.

Figure 7:
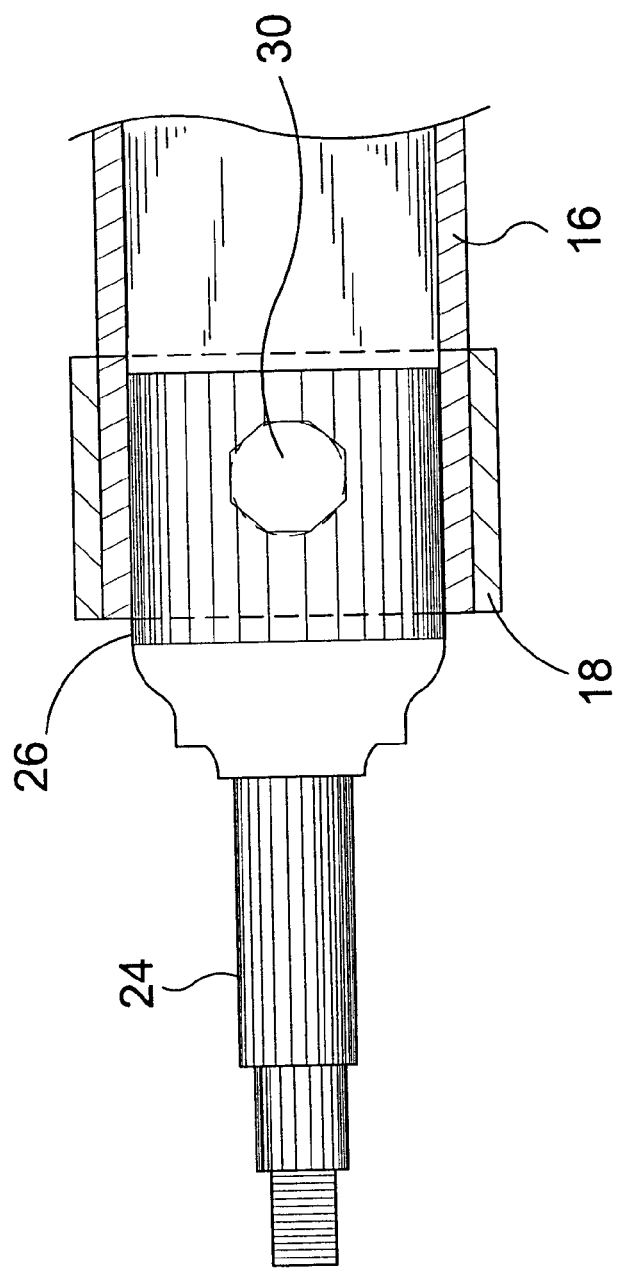
FIG. 7 is a sectional view of the present invention.

Turning to FIG. 7, shown therein is a sectional view of the present invention being an axle that is non-recyclable, quickly serviceable and shipped efficiently comprising an axle beam 16 with a removable and replaceable spindle 24. The detachable spindle 24 has an extended back end 26 which is inserted in the axle beam 16. The axle beam 16 ends are reinforced with a collar 18. The detachable spindle 24 and the axle beam 16 are locked together with a sleeved cross connector assembly 30. The deformable sleeve is fitted over the shaft of the cross connector 30 and the sleeved cross connector assembly is pressed into the cross-hole which is drilled through the collar 18 and the back end 26 of the detachable spindle 24. The deformable material is compressed into the cross-hole to assure a tight fit and minimize any axial and radial movement between the spindle 24 and the axle beam 16.

Figure 8:
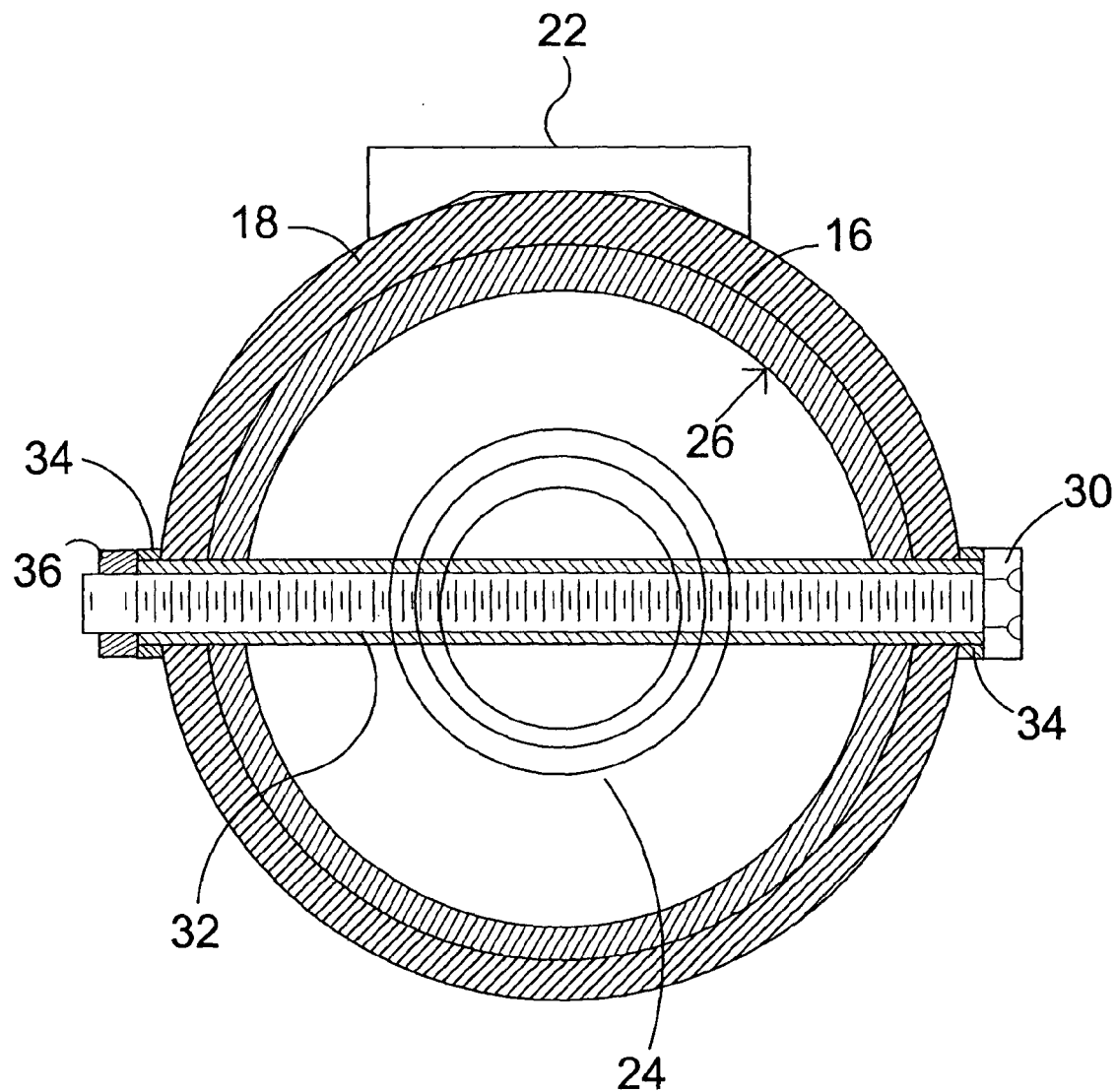
FIG. 8 is a sectional view of the present invention.

Turning to FIG. 8, shown therein is sectional view of the present invention being an axle that is non-recyclable, quickly serviceable and shipped efficiently comprising an axle beam with a removable and replaceable spindle. The detachable spindle 24 has an extended back end 26 which is inserted in the axle beam 16. The axle beam ends are reinforced with a collar 18. The detachable spindle 24 and the axle beam 16 are locked together with a sleeved cross connector assembly 30, 32, 34, 36. The deformable sleeve 32 is fitted over the shaft of the cross connector 30 and the sleeved cross connector assembly is pressed into the cross-hole which is drilled through the collar 18 and the back end 26 of the detachable spindle 24. The rubber like sleeve 32 material is compressed into the cross-hole to assure a tight fit and minimize any axial and radial movement between the spindle 24 and the axle beam 16.

Figure 9:
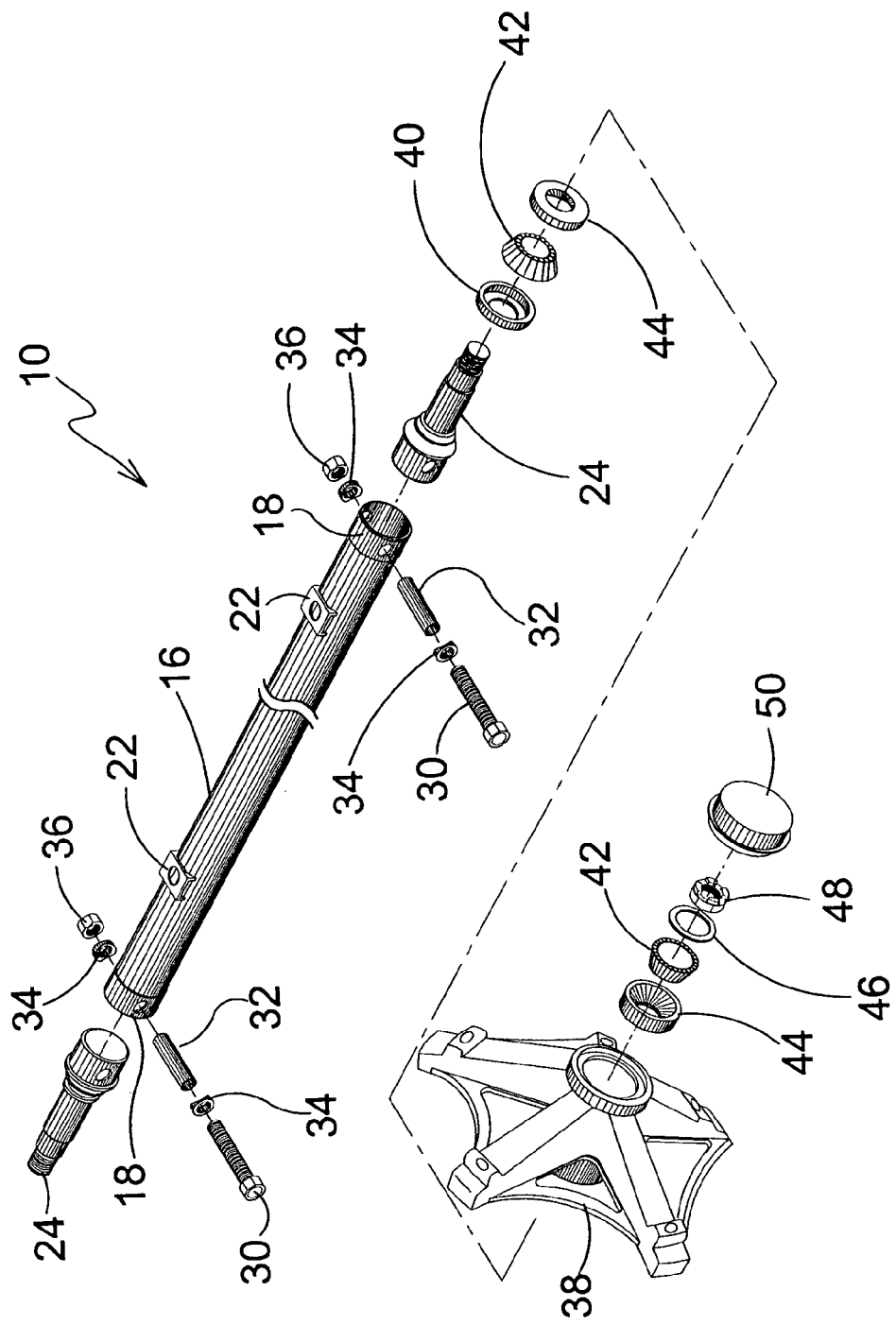
FIG. 9 is an exploded view of the present invention.

Turning to FIG. 9, shown therein is an exploded view of the present invention 10. Shown is the present invention 10 being an axle that comprises an axle beam with a removable and replaceable spindle. The detachable spindle 24 has an extended back end which is inserted in the axle beam 16. The axle beam 16 ends are reinforced with a collar 18. The detachable spindle 24 and the axle beam 16 are locked together with a sleeved cross connector assembly 30, 32, 34, 36. The deformable sleeve 32 is fitted over the shaft of the cross connector 30 and the sleeved cross connector assembly is pressed into the cross-hole which is drilled through the collar 18 and the back end of the detachable spindle 24. Also shown are the hub 38, grease seal 40, inner and outer bearings 42, inner and outer cups 44, washer 46, fastener 48 and dust cover 50.

Figure 10:
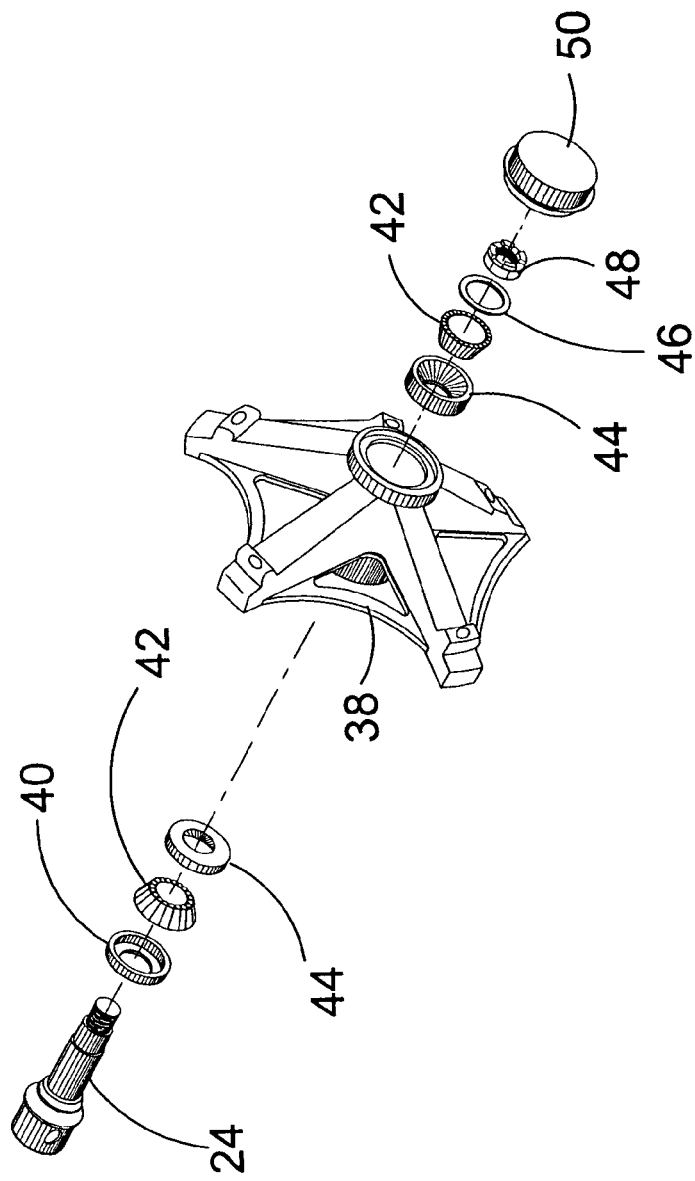
FIG. 10 is an exploded view of the present invention.

Turning to FIG. 10, shown therein is an exploded view of parts of the present invention. Shown is the present invention 10 being an axle that comprises an axle beam with a removable and replaceable spindle 24. The detachable spindle 24 has an extended back end which is inserted in the axle beam. The axle beam ends are reinforced with a collar. The detachable spindle 24 and axle beam are locked together with a sleeve cross connector assembly. A deformable sleeve is fitted over the shaft of the cross connector and the sleeved cross connector assembly is pressed into the cross-hole which is drilled through the collar and the back end of the detachable spindle. Also shown are the hub 38, grease seal 40, inner and outer bearings 42, inner and outer bearing cups 44, fastener 48, washer 46 and dust cover 50.

Figure 11:
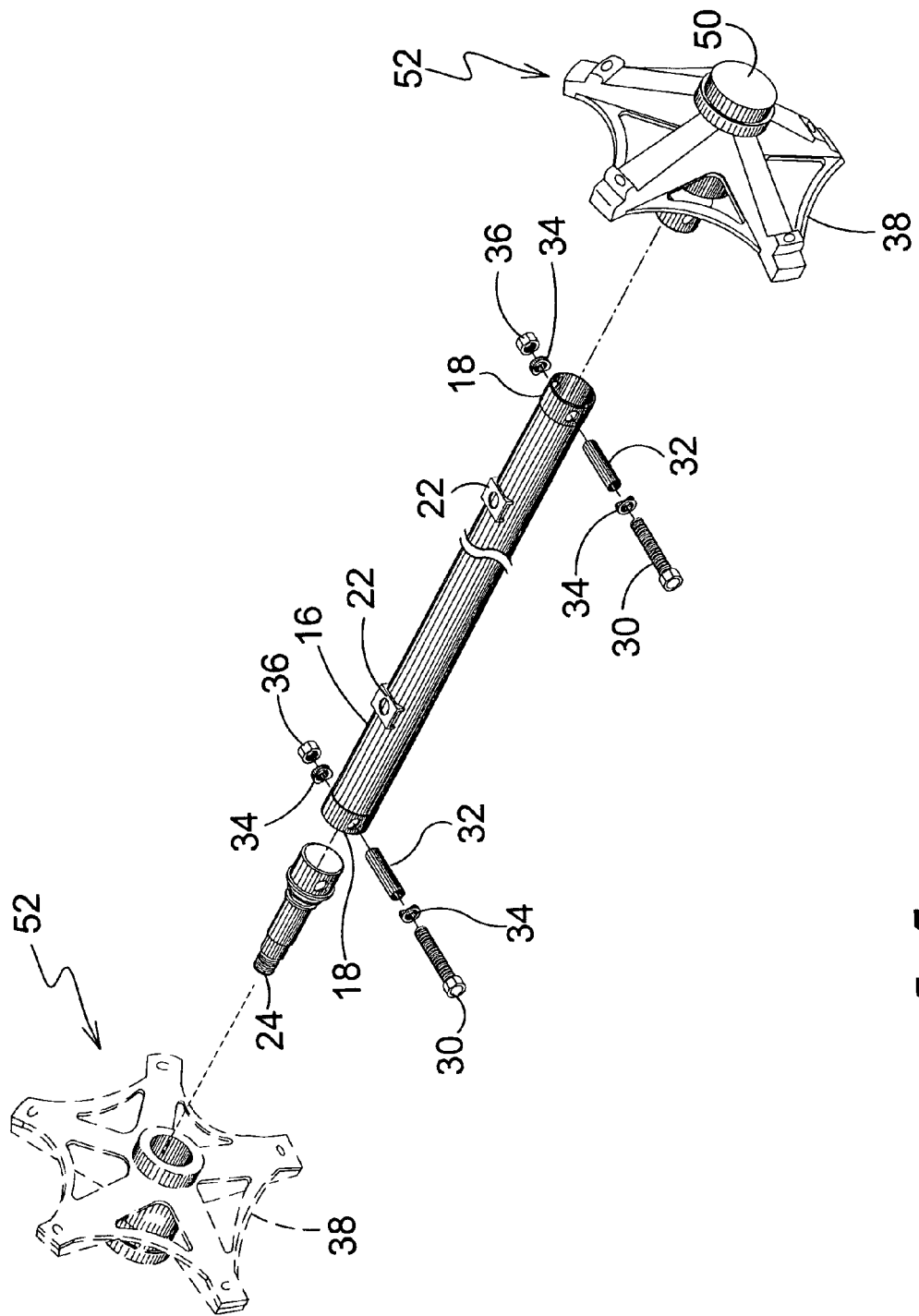
FIG. 11 is a perspective view of the present invention.

Turning to FIG. 11, shown therein is a perspective view of the present invention. Shown is the wheel assembly 52 with hub 38 and dust cover 50 mounted on the spindle 24 of the present invention and separate from the axle beam 16. Other elements previously shown are also disclosed.

Figure 12:
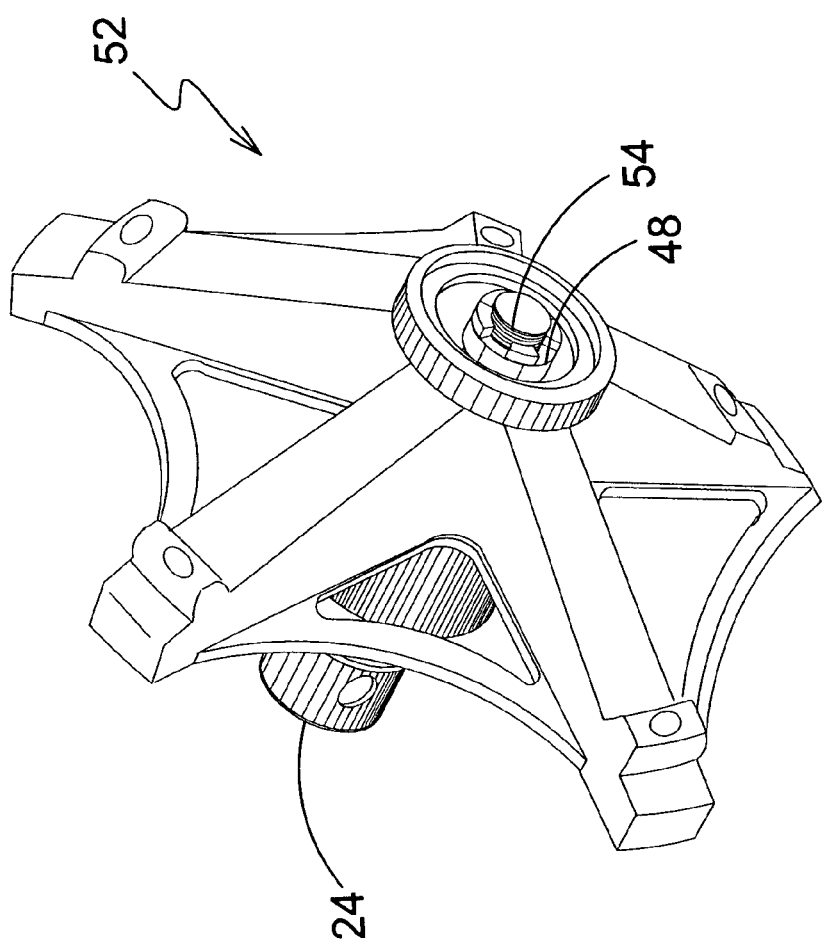
FIG. 12 is a perspective view of the present invention.

Turning to FIG. 12, shown therein is a perspective view of the present invention. Shown is the wheel assembly 52 mounted on the spindle 24 of the present invention and separate from the axle. To disable the fastener 48, either the spindle threads 54 are crushed or the fastener is spot welded. Once the fastener 48 is disabled, it cannot be removed and access to the spindle and wheel end components is denied. Without access to these components the wheel end is not recyclable.

I claim:

1. An axle having detachable spindles for connection to a wheel assembly for use on a vehicle, comprising:
   a) an axle tube having first and second opposing ends, said first and second ends each having first cross apertures therein;
   b) means for attaching said axle tube to the vehicle, whereby the axle tube can be removably attached to the vehicle;
   c) a collar disposed on each of said first and second ends of said axle tube to permit the ends of the axle tube to be strengthened, said collars each having second cross apertures therein, wherein said second cross apertures are co-aligned with said first cross apertures;
   d) a spindle disposed on each of said first and second ends of said axle tube, said spindle having first and second opposing ends, wherein said first end is connected to a wheel assembly, wherein said second end is matingly disposed inside of each of said first and second ends of said axle tube, wherein said second end of each of said spindles has a third cross aperture therein, wherein said third cross apertures are co-aligned with said first cross apertures; and,
   e) means for a cross connector for connecting said spindles to said axle tube whereby a cross connector passes through the first, second and third cross apertures to connect the spindle, collar and axle tube, means for a wheel assembly being disposed on said first end of said spindle whereby the wheel assemblies of the vehicle can be attached to the axle; and
   f) threads being disposed on said first end of said spindle to permit attachment to the wheel assembly of the vehicle, wherein said means for attaching said axle tube to the vehicle comprises a pair of spring seats disposed on said axle tube to permit said axle tube to be removably mounted to the vehicle, said spring seats are spaced apart on the outside of said axle tube, said spring seats being complementarily spaced apart a distance for cooperative alignment with the vehicle, said axle tiube, said collar and said second end of said spindle are sized to be tightly fitted together and said means for a cross connector comprises:
      i) an elongated cross connector having first and second opposing ends, wherein said cross connector has a head on said first end and threads on said second end, wherein said cross connector passes through said first, second and third cross apertures to permit said axle tube, collar and spindle to be joined together;
      ii) a sleeve disposed on said cross connector to permit said cross connector to tightly fit in said first, second and third cross apertures to permit said axle tube, collar and spindle to be tightly joined together; and,
      iii) a fastener being disposed on said threads of said cross connector to permit said axle tube, collar and spindle to be tightly joined together.

2. The axle of claim 1, further comprising washers being disposed on said first and second ends of said cross connector to permit said axle tube, collar and spindle to be tightly joined together.

3. The axle of claim 2, wherein said sleeve is made of deformable material.

4. The axle of claim 3, wherein said sleeve is made of compressible material.

5. The axle of claim 3, wherein said sleeve is made of rubber material.

6. The axle of claim 5, wherein said means for a wheel assembly comprises:
   a) a wheel hub to permit a wheel to be attached thereto, said hub having an inside and an outside, said hub having an inner and outer bearing cup;
   b) an inner and outer bearing being disposed respectively in said inner and outer bearing cups;
   c) an inner grease seal being disposed inside said inner bearing to permit grease to be retained in said inner bearing cup;
   d) a washer being disposed outside said outer bearing; and,
   e) a threaded fastener matingly disposed on said threaded end of said spindle being disposed outside said washer to permit the wheel assembly to be mounted to the spindle.

7. The axle of claim 6, wherein said fastener is fixedly mounted onto said threads of said spindle so that said fastener cannot be removed from said spindle.

8. The axle of claim 7, wherein said spindle and said wheel assembly can be removed from said axle tube by disconnection of said spindle from said axle tube when said fastener is fixedly mounted onto said threads of said spindle.

* * * * *